J. Baker,
Scoop & Sifter.
No. 111,605. Patented Feb. 7, 1871.
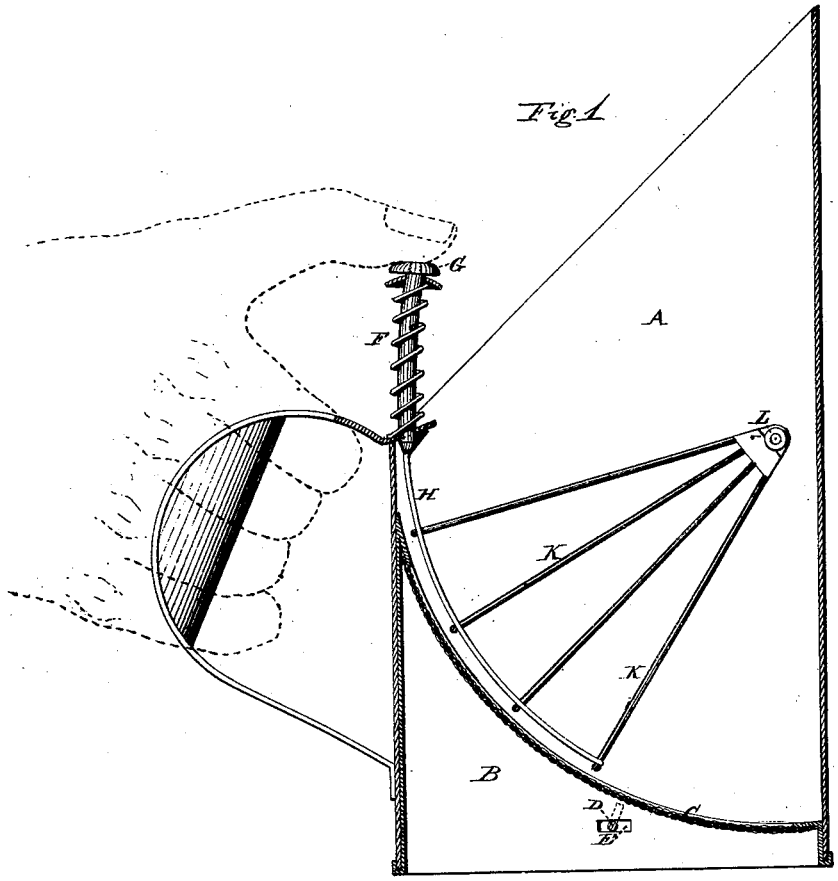
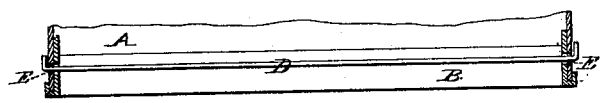
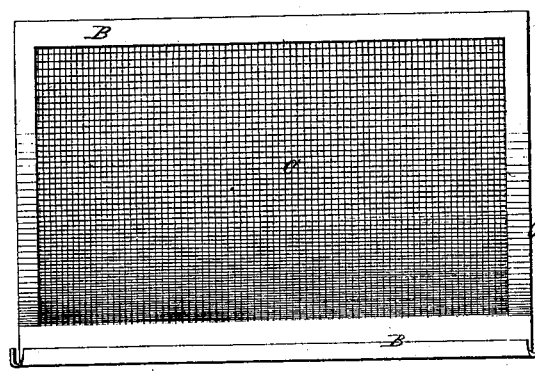
Witnesses
Harry King
Phil. T. Dodge
Inventor
Joseph Baker
by Dodge & Munn
Atty.

United States Patent Office.

JOSEPH BAKER, OF TRENTON, CANADA.

Letters Patent No. 111,605, dated February 7, 1871.

IMPROVEMENT IN SCOOPS AND SIFTERS.

The Schedule referred to in these Letters Patent and making part of the same.

*To all whom it may concern:*

Be it known that I, JOSEPH BAKER, of the village of Trenton, in the county of Hastings and Dominion of Canada, have invented certain Improvements in Flour and Grain-Scoops and Sifters, of which the following is a specification, reference being had to the accompanying drawing.

Nature and Objects of the Invention.

My improvements relate to the combination of an ordinary scoop for scooping flour, meals, grains, spices, drugs, &c., and of a sifter for sifting them, and separating dirt or foreign matter from the flour or grain or other matter required to be sifted.

Description of the Accompanying Drawing.

Figure 1 is a vertical section;

Figure 2 is a transverse section of the bottom portion, showing the method of securing the detachable sieve; and Figure 3, a front view of the sieve, detached.

A is the body of scoop.
B is the sifter.
C is the sieve-cloth.
D is the attaching wire-rod.
E E are small holes to receive wire-rod.
F is the spring.
G is the thumb-knob.
H is the handle of the agitator.
K is the agitator.
L L are the pivots of agitator.

General Description.

The scoop A may be made of tin, sheet-iron, copper, or any other suitable material, and of any required size and shape.

The sifter B may be made of the same material, and in such shape as to be easily inserted in scoop A through its open bottom; and The sieve-cloth C may be made of fine brass or other wire, silk or other tissue or texture, as may be best adapted to the sifting of flour, meal, drugs, spices, seeds, grain, or other products or things requiring to be sifted.

The top of sifter B, formed by sieve-cloth C, is made concavous, so as to permit the working of agitator K.

A frame-work of wire, K, called an agitator, is suspended inside the scoop A by means of pivots, L L, and reaches near the surface of sifter B, over which it plays backward and forward, and thus causes the flour or other matter to be agitated and to pass rapidly through the sieve.

A handle, H, is attached to agitator K, and, passing upward inside of scoop through an eyelet made in the projection of the handle of the scoop, receives a spiral spring, F, and is capped with a thumb-knob, G, screwed on its upper end, so that it may easily be taken off.

The spring F is coiled loose round handle H, between thumb-knob G and the upper side of the projection of the scoop-handle, and is intended to put agitator K in motion.

When sifter B has been inserted in the bottom of the scoop, it is firmly attached to it by means of a wire-rod, D, passing through scoop and sifter, from one side to the other, in small holes, E E, perforated for that purpose at the base of the scoop and sifter.

The wire rod D is itself prevented from receding through the holes E E by small loopes or curves at each of its ends, turned at right angle, the one to the other.

By this means the sifter B is easily detachable from the scoop, and may be replaced by similar sifters having finer or coarser sieve-cloth, a feature which is a great improvement on permanent sifters.

The spiral spring F being put loose on the handle H of agitator K, and held in place by thumb-knob G screwed over it, may also be easily detached and replaced by a stronger or weaker spring, according to the pressure required on agitator K or the strength of the hand of operator.

The mode of operating with the scoop and sifter is as follows:

Having scooped up the flour, meal, drug, grain, &c., required to be sifted, a pressure of the thumb on the knob G will give the spiral spring F the necessary recoil to cause agitator K to play backward and forward and make the flour, grain, &c., pass rapidly through the sieve-cloth C, leaving all foreign matter and dirt inside the scoop.

In sifting, the top of the scoop ought to be inclined toward the operator, in order to bring the sifter level, and thus have the full benefit of the sieve.

Claims.

1. The scoop A, provided with a detachable sifter, B, whereby sifters of different degrees of fineness may be used in connection with the scoop at will, substantially as described.

2. In combination with the combined scoop and sifter, the agitator K, having the spiral spring F applied to the thumb-piece or stem, substantially as set forth.

JOSEPH BAKER.

Witnesses:
DUFF CAMERON,
JOHN WALKER MARSH.